July 18, 1950          J. A. ZUBLIN          2,515,366
HEAVY-DUTY FLEXIBLE DRILL PIPE
Filed May 4, 1948          2 Sheets-Sheet 1
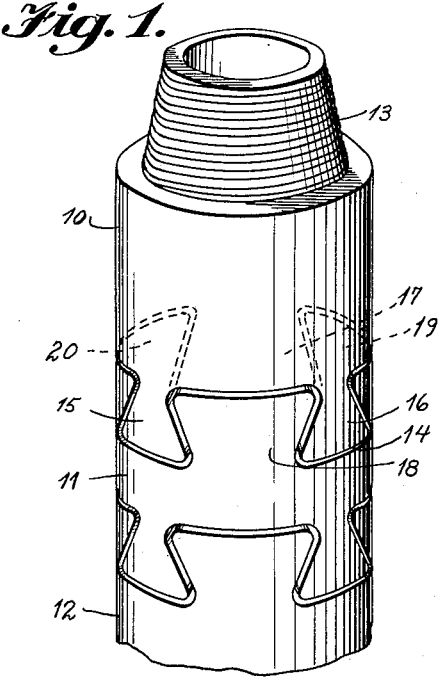
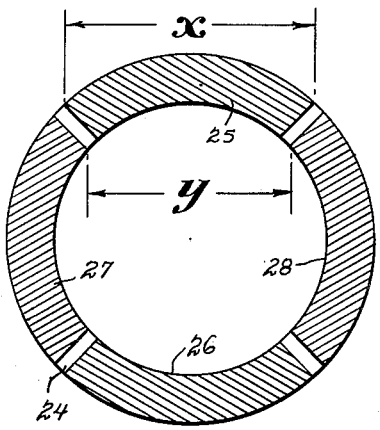
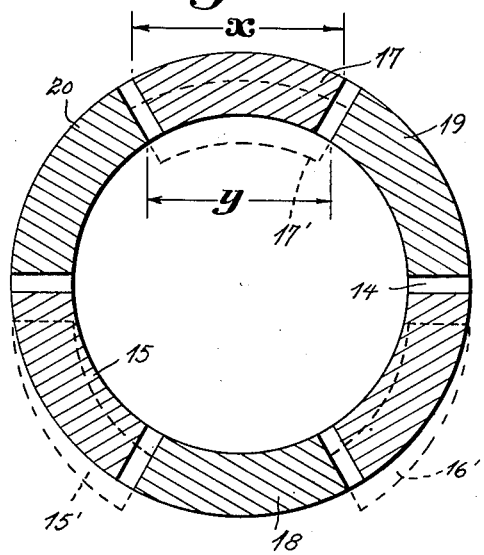
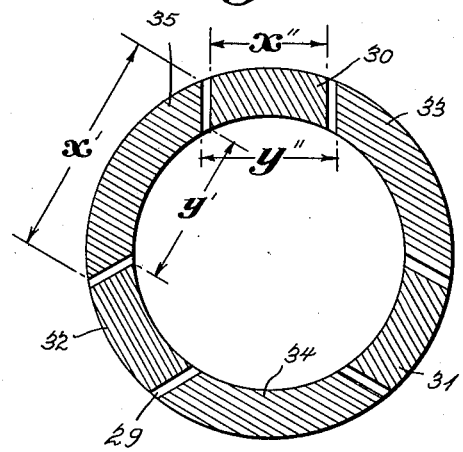
INVENTOR.
John A. Zublin
BY
Burns, Doane & Benedict
ATTORNEYS

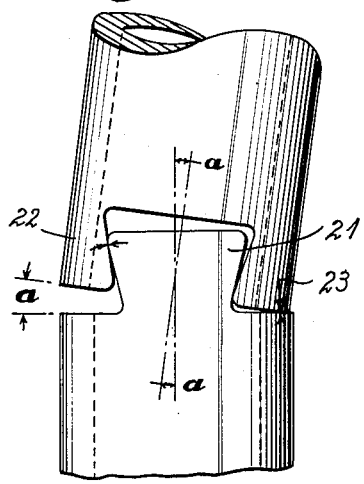
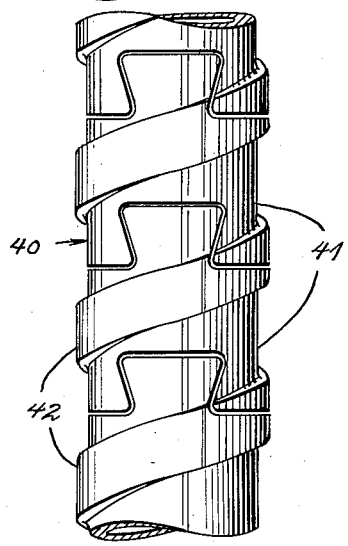
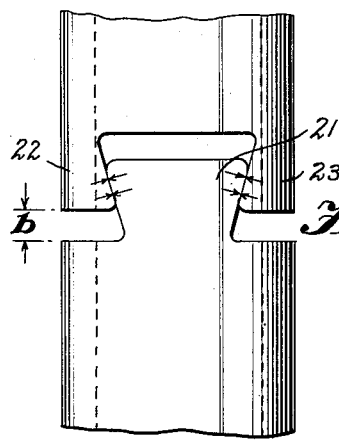
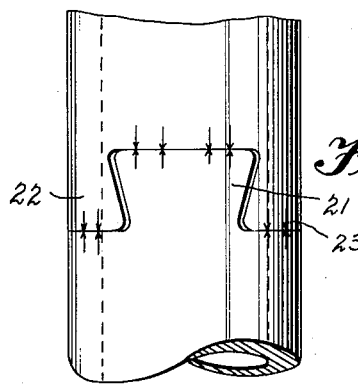
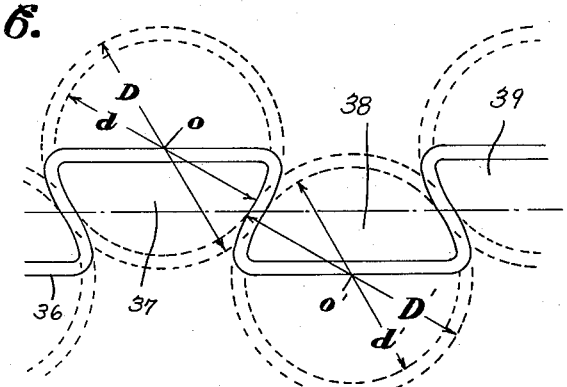

Patented July 18, 1950

2,515,366

UNITED STATES PATENT OFFICE

2,515,366

HEAVY-DUTY FLEXIBLE DRILL PIPE

John A. Zublin, Los Angeles, Calif.

Application May 4, 1948, Serial No. 25,037

4 Claims. (Cl. 255—28)

In my copending application Serial No. 738,335, filed March 31, 1947, entitled "Flexible Drill Pipe," I have described and claimed a flexible drill pipe having a generally helical slot in the wall thereof which imparts flexibility to the drill pipe. According to the disclosure of that application, the opposed edges of the slot are provided with complementary teeth which interengage for the purpose of preventing excessive distortion of the pipe. The present application relates to an invention which embodies some of the principles of the above-mentioned application, but the present application discloses additional and improved structures which are particularly useful for drilling lateral bores deviating from existing well bores and for side wall coring in wells.

In one form of the invention disclosed in my above-mentioned application Serial No. 738,335, the opposed edges of the slot are provided with interengaging and loosely interlocking teeth of complementary dove-tail configuration. The teeth of this configuration prevent excessive distortion of the tubular member, irrespective of whether the stresses applied to the member tend to cause elongation, bending or twisting. The form of the invention illustrated in that application is satisfactory when the stresses are not so great as to cause the tubular member to distort to such an extent that the teeth disengage as a result of radial displacement relative to each other. When the interlocking teeth disengage as a result of relative radial displacement, the tubular member is likely to telescope upon itself when subjected to compression stresses, bending stresses, or torque stresses. The tubular member is also likely to become elongated and to acquire a permanent set when tensile stresses are applied to the member while the teeth are disengaged. It has been found that a tubular member constructed in accordance with the teachings of the above application cannot be expected to assume a curvature with a radius of less than about eight times the diameter of the tubular member without permanent injury to the member.

The flexibility of such a tubular member could be increased by reducing the pitch of the helical slot, but I have found that too great a reduction in the pitch is impractical because the member will then assume the characteristics of a coil spring, which by its very nature is unstable and hard to control. Flexibility of such a tubular member could also be increased by reducing the thickness of the wall of the member but this can be done only with a sacrifice in the ultimate strength of the member. It will also be apparent that if the wall of the tubular member is reduced in thickness there will be a greater tendency for the interlocking teeth to become disengaged, which would lead to the undesirable results discussed above.

One of the uses for such flexible tubular members in which I am particularly interested is in connection with the drilling of lateral bores deviating from the vertical bores of wells such as oil wells. In another copending application, Serial No. 769,489, filed August 19, 1947, entitled "Apparatus for Side Wall Coring," (now abandoned), I have described the use of such a flexible tubular member as the drill stem for a bit used for taking cores from the side wall of a well. It is difficult and often impractical to provide fluid circulation around a side wall coring bit, and it is, therefore, often necessary to resort to dry cutting of the core. In the absence of fluid circulation, some means must be provided for removing the loose material in the annular space between the core and the core hole.

The present invention overcomes the disadvantages and difficulties described above. In accordance with the teachings of the present invention a plurality of generally circumferential slots are cut through the wall of a tubular member and the slots are distributed along the length of the member so that the member is divided into a plurality of sections. While the slots are generally circumferential, they deviate from a true circumference in a manner to form a plurality of interengaging and loosely interlocking teeth of dove-tail configuration. There are a plurality of such dove-tail teeth on each end of each section and the interlocking of these teeth limits the extent of relative axial movement of the adjacent sections. The width and direction of the slots, the shape of the teeth and the thickness of the wall of the tubular member are correlated in a manner hereinafter described to prevent the sections from becoming separated.

I also contemplate the forming of a helical groove extending around and along the tubular member when the member is to be used as a drill stem for a coring bit. The helical groove, or rather the ridges lying between convolutions of the helical groove, serve to convey the loose material out of the annular space between a core and the core hole. Such an arrangement is particularly advantageous in those instances where fluid circulation in the core hole is either impractical or impossible.

The primary object of the present invention is to provide a flexible drill pipe which will assume a curvature with a radius sufficiently short to make the drill pipe practical for use in drilling bores which deviate laterally from existing well bores. A further object of the invention is to provide a flexible drill pipe which is extremely rugged and which will withstand use in operations which require the drill pipe to withstand tremendous stresses. A still further object of the invention is to provide a heavy duty drill pipe which is flexible and in which none of the elements of the pipe are required to bend. A further object of the invention is to reduce the likelihood of fatigue failure in flexible drill pipes. Still another object of the invention is to provide a flexible drill pipe for use in side wall coring operations in which means are provided on the pipe for conveying loose cuttings from the core hole.

Further objects and advantages of the invention will be referred to in the following detailed description of exemplary forms of my invention. The detailed description makes reference to the accompanying drawings wherein:

Figure 1 is a perspective view of a portion of a drill pipe constructed in accordance with one form of the invention;

Figure 2 is a transverse sectional view of the form of the invention illustrated in Figure 1, this view being taken through the mid-sections of the interlocking teeth which join adjacent sections of the drill pipe;

Figure 3 is a view comparable to Figure 2, but illustrating a modified form of the invention;

Figure 4 is also a view comparable to Figure 2, and illustrates still another form of the invention;

Figure 5 is a diagrammatic view illustrating the relationship between adjacent sections of the drill pipe during bending of the drill pipe;

Figure 6 is a diagrammatic view illustrating the relationship between adjacent sections of the drill pipe when subjected to tensile stresses;

Figure 7 is a diagrammatic view illustrating the relationship between adjacent sections of the drill pipe when the drill pipe is subjected to compression;

Figure 8 is a side elevation view of a short length of drill pipe provided with a means for conveying loose cuttings from a core hole; and Figure 9 is a view showing a development in a plane of a joint between two sections of drill pipe illustrating a modified shape for the dove-tail teeth.

I have illustrated in Figure 1 a portion of a drill pipe consisting of the sections 10, 11 and 12. The section 10 is provided with threads 13 for connection to another length of flexible drill pipe or to any standard rigid drill pipe. The sections 10 and 11 are divided by a slot 14 which extends generally circumferentially about the drill pipe, and which has the configuration shown in the drawing to provide teeth 15, 16 and 17 of dove-tail configuration on the lower end of the section 10 and similar teeth 18, 19 and 20 on the upper end of the section 11. The sections 11 and 12 and the remaining sections of the drill pipe are connected in the same manner and it will suffice to describe only the joint between the sections 10 and 11.

Figures 5, 6 and 7 illustrate diagrammatically the manner in which the teeth of dove-tail configuration limit the extent of certain types of relative movement between adjacent sections of the flexible drill pipe. Figure 5 illustrates the manner in which teeth 21, 22 and 23 cooperate to limit the extent of relative angular movement between sections to the angle $a$. In this figure the arrows indicate the forces of action and reaction between abutting surfaces of the two sections. Figure 6 illustrates the position assumed by adjacent sections of drill pipe when the drill pipe is subjected to tensile stresses. The edges of the tooth 20 abut the edges of the teeth 22 and 23 to limit the relative axial movement to the distance designated $b$. The arrows in this figure illustrate the forces of action and reaction between the abutting surfaces of the members. Figure 7 illustrates the positions assumed by adjacent sections when the drill pipe is subjected to compressive stresses. The relationship will be apparent from a mere inspection of this figure in which the arrows designate the forces of action and reaction between the abutting surfaces of the members.

It will also be apparent from an inspection of Figures 6 and 7 that the flexible drill pipe will tend to assume a straight configuration when subjected to either tension or compression. This is an advantage of my flexible drill pipe because it aids in manipulating drill bits on the lower end of drill pipes when it is desired to drill a straight bore which deviates from a curved bore.

The foregoing reference to Figures 5, 6 and 7 explains the manner in which the intermeshing teeth of dovetail configuration cooperate to prevent separation of the sections when the drill pipe is subjected to tension, compression or bending. Those figures do not disclose the manner in which the teeth prevent the sections from becoming separated by relative lateral movement. This cooperation can be best understood by reference to Figures 2, 3 and 4. Figure 2 illustrates the teeth 18, 19 and 20 on the section 11. The teeth 15, 16 and 17 on the section 10 are shown in their normal or neutral positions by full lines. The dotted line positions in Figure 2, designated by the reference numerals 15', 16', and 17', illustrate the positions of the teeth 15, 16 and 17 after the section 10 has been moved laterally relative to the section 11. It will be seen that the edges of the tooth 17 abut the adjacent edges of the teeth 19 and 20 when the tooth 17 is in the position 17' designated by the dotted lines. It will also be noted that one edge of the tooth 15 abuts the adjacent edge of the tooth 18, and that one edge of the tooth 16 abuts the adjacent edge of the tooth 18. The extent of relative lateral movement between the sections is thus effectively limited so that none of the interlocking teeth of a joint can become disengaged. Although Figure 2 illustrates relative lateral movement between the sections 10 and 11 in only one direction, it will be apparent that relative lateral movement in any other direction will be limited in the same manner and to the same extent.

It will be apparent from an inspection of Figure 2 that the distance $x$ between the outer corners of one tooth should be greater than the distance $y$ between the adjacent inner corners of adjacent teeth. I have found this to be a convenient manner of expressing the rather complicated relationship between the thickness of the wall of the tube, the width of the slot 14 and the direction in which the slot 14 extends through the wall of the tube.

Six intermeshing teeth are present in each joint in the form of the invention illustrated in Figures 1 and 2. A greater number of teeth may be employed in each joint, but I have found that no appreciable advantage is derived from increasing the number beyond six. The advantages of the invention may be obtained by employing four teeth in each joint, and such an arrangement is illustrated in Figure 3. The slot is designated by the reference numeral 24. The teeth 25 and 26 are on one section of the tubing and the teeth 27 and 28 are on the other section of the tubing. The relationship is otherwise the same as that illustrated in Figure 2. The sections of tubing will not become separated by relative lateral movement so long as the distance $x$ between the outer corners of one tooth exceeds the distance $y$ between the adjacent inner corners of adjacent teeth.

The slots 14 and 24 have been illustrated as extending in radial directions through the walls of the pipes. That arrangement is to be preferred because radially extending slots can be cut with greater facility, but it is not necessary as will be apparent from an inspection of Figure 4. The slot is designated by the reference numeral 29. The teeth 30, 31 and 32 are on one section of the drill pipe and the teeth 33, 34 and 35 are on the other section of the drill pipe. It will be noted that the slot 29 extends through the wall of the pipe in such manner that the lateral edges of the tooth 30 are parallel to each other, the same being true of the teeth 31 and 32. However, the edges of the tooth 33 converge toward the inner surface of the wall of the pipe to a much greater extent than was true of the teeth formed by the radial slots of Figures 2 and 3. The edges of the teeth 34 and 35 converge in a manner similar to the edges of the tooth 33. Referring particularly to the tooth 35, it will be seen that the distance $x'$ between the outer corners of this tooth is greater than the distance $y'$ between the adjacent inner corners of the teeth 30 and 32. The same relationship holds true for the teeth 33 and 34, and the sections of the pipe will not separate by relative lateral movement so long as teeth having this relationship are distributed around the circumference of the pipe. It will be seen that the relationship just described is not true with reference to the teeth 30, 31 and 32. The distance between the outer corners of the tooth 30, which distance is designated by the reference character $x''$, is less than the distance between the adjacent inner corners of the teeth 33 and 35, which distance is designated by the reference character $y''$.

Figure 9 illustrates a form of dove-tail tooth which may be used instead of the form illustrated in the other figures of the drawings. The slot 36 assumes a path which results in giving portions of the edge of the tooth 37 curvatures which are arcs of a circle having a center at $O$ and a diameter $d$. Another portion of the edge of the tooth 37 has a curvature which is an arc of a circle having its center at $o'$ and a diameter $D'$. A portion of the edge of the tooth 38 is an arc of a circle having its center at $o$ and a diameter $D$, while other portions of the edges of this tooth form arcs of a circle having its center at $o'$ and a diameter $d'$. The tooth 39 and the additional teeth are of similar configuration. I have found that teeth of the configuration shown in Figure 9 minimize shock and wear between the sections of the drill pipe.

I prefer to construct my flexible drill pipe by starting with a unitary tubular member and cutting the slots therein. A conventional drill pipe is suitable for use as the initially unitary member although in some instances it may be desirable to use tubular members constructed of somewhat higher quality alloy steels. The slots may be cut with any suitable equipment in any manner now known in the metal-cutting art. I have successfully used a cutting torch for cutting the slots. It will be apparent that the sections cannot be manufactured independently as complete integral units and then assembled for the reason that the features which prevent disassembly of the assembled sections would also prevent their assembly. It would be possible to cast the sections in interlocking engagement with each other in somewhat the manner that chains have been cast, but it is unlikely that the castings would have the requisite strength for heavy-duty equipment. It is also possible that the sections might be fabricated and assembled in other ways, but the forming of the assembled sections by cutting slots in an integral tubular member is far preferable to any other procedure now known to me.

In Figure 8 I have illustrated a flexible drill pipe which is particularly useful as a drill stem for a side wall coring bit in operations where it is either impossible or inconvenient to utilize fluid circulation in the core hole. The flexible drill pipe is designated generally by the reference numeral 40. A helical groove 41 extends around and along the pipe. The ridge 42 between the convolutions of the helical groove 41 functions in a manner similar to a spiral conveyor to convey the loose cuttings from the core hole, thus eliminating the necessity for fluid circulation. Spiral groove 41 is preferably cut on the tubular member while it is an integral unit and before the slots have been cut to divide the tubular member into sections.

The flexibility of my drill pipe can be controlled within limits by selecting appropriate lengths for the sections which make up the drill pipe. A drill pipe which consists of a large number of relatively short sections can assume a curvature having a smaller radius than would be the case with a drill pipe consisting of a lesser number of longer sections. The sections need not be of uniform length throughout the length of the drill pipe and it is possible to produce a drill pipe having a certain flexibility along one portion of its length and greater or lesser flexibility along other portions of its length. The permissible relative movement between any two joined sections is controlled to a considerable extent by the width of the slot which defines the inter-locking teeth. A slot of greater width permits greater relative movement between the sections. Care must be taken, however, to maintain the relationships discussed above in connection with Figures 2 and 3 or 4.

The foregoing detailed description of exemplary forms of my invention has been given to enable others to understand my invention and to obtain the benefits thereof. However, it is understood that the invention is not limited to the exemplified forms and that various modifications may be resorted to without departing from the scope of the invention as defined by the following claims.

Having thus described my invention, I claim:

1. A flexible pipe comprising an elongated tubular member subdivided into a plurality of sections of rigid pipe of substantial wall thickness in end to end relationship with a plurality of dovetail teeth and complementary recesses on the opposite ends of the intermediate sections, the teeth of one section being positioned in the recesses and loosely interlocking the teeth of the adjacent sections with appreciable clearance to form a loose joint permitting limited relative movement in any direction between the sections, said teeth having substantially flat end portions lying in planes generally perpendicular to the axis of the pipe, at least certain of said recesses having their side edges converging from the outer surface of the pipe wall to the inner surface thereof and the side edges of the teeth positioned in such recesses also converging from the outer surface of the pipe to the inner surface thereof, the extent of such convergence being so related to the thickness of the wall of the pipe and the normal clearance between the teeth and their respective recesses that the tapered edges of any such recess abut the tapered edges of the tooth therein after limited radial inward movement of such tooth, such converging recesses being sufficient in number and so spaced about the circumference of the pipe as to prevent disengagement of the sections by excessive relative lateral movement in any direction.

2. A flexible pipe comprising a pipe having a generally circumferential slot of appreciable normal width through its wall dividing the pipe into sections, said slot defining the edges of at least three complementary teeth of dove-tail configuration on each side of the slot, the teeth on one side of the slot intermeshing and loosely interlocking the teeth on the opposite side of the slot to provide a loose joint and to prevent axial separation of the sections, said teeth having substantially flat end portions lying in planes generally perpendicular to the axis of the pipe to cause said pipe to tend to assume a straight configuration when subjected to compressive stresses, the slot extending through the wall of the pipe in directions such that at least three of the teeth around the circumference of the pipe converge in width from the outer surface of the pipe to the inner surface thereof, the width of the slot being so related to the extent of convergence of the teeth and the thickness of the wall of the pipe that at least one converging tooth will abut adjacent edges of adjacent teeth after limited relative lateral movement of the sections in any direction to thus prevent lateral separation of the sections.

3. A flexible pipe as described in claim 2 having a ridge extending helically around and along the outer surface of the pipe.

4. A flexible pipe as described in claim 1 having a ridge extending helically around and along the outer surface of the pipe.

JOHN A. ZUBLIN.

REFERENCES CITED

The following references are of record in the file of this patent:

UNITED STATES PATENTS

| Number | Name | Date |
|---|---|---|
| 276,472 | Rittenhouse et al. | Apr. 24, 1883 |
| 591,204 | Bittenbender | Oct. 5, 1897 |
| 1,006,661 | Knapp | Oct. 24, 1911 |
| 2,141,880 | Satre | Dec. 27, 1938 |
| 2,330,933 | Terrell, Jr. | Oct. 5, 1943 |
| 2,463,353 | Brown et al. | Mar. 1, 1949 |